US008782221B2

(12) United States Patent
Han

(10) Patent No.: US 8,782,221 B2
(45) Date of Patent: Jul. 15, 2014

(54) METHOD TO ALLOCATE BUFFER FOR TCP PROXY SESSION BASED ON DYNAMIC NETWORK CONDITIONS

(75) Inventor: Liang Han, Pleasanton, CA (US)

(73) Assignee: A10 Networks, Inc., San Jose, CA (US)

( * ) Notice: Subject to any disclaimer, the term of this patent is extended or adjusted under 35 U.S.C. 154(b) by 169 days.

(21) Appl. No.: 13/541,792

(22) Filed: Jul. 5, 2012

(65) Prior Publication Data

US 2014/0012972 A1 Jan. 9, 2014

(51) Int. Cl.
*G06F 15/173* (2006.01)

(52) U.S. Cl.
USPC ............................ 709/224; 709/223; 709/226

(58) Field of Classification Search
USPC ......... 709/203, 217, 224, 225, 226, 227, 232, 709/235; 370/241; 726/4, 26
See application file for complete search history.

(56) References Cited

U.S. PATENT DOCUMENTS 5,935,207 A 8/1999 Logue et al.
5,958,053 A 9/1999 Denker
6,047,268 A 4/2000 Bartoli et al.
6,219,706 B1 4/2001 Fan et al.
6,321,338 B1 11/2001 Porras et al.
6,748,414 B1 6/2004 Bournas
6,772,334 B1 8/2004 Glawitsch
6,779,033 B1 8/2004 Watson et al.
7,010,605 B1 3/2006 Dharmarajan
7,234,161 B1 6/2007 Maufer et al.
7,236,457 B2 6/2007 Joe
7,254,133 B2 8/2007 Govindarajan et al.
7,269,850 B2 9/2007 Govindarajan et al.
7,277,963 B2 10/2007 Dolson et al.
7,301,899 B2 11/2007 Goldstone
7,328,267 B1 * 2/2008 Bashyam et al. ............. 709/227
7,337,241 B2 2/2008 Boucher et al.
7,370,353 B2 5/2008 Yang
7,391,725 B2 6/2008 Huitema et al.
7,398,317 B2 7/2008 Chen et al.
7,430,755 B1 9/2008 Hughes et al.

(Continued)

FOREIGN PATENT DOCUMENTS

EP 1209876 A2 5/2002
EP 1770915 A1 4/2007

(Continued)

OTHER PUBLICATIONS

Spatscheck et al., "Optimizing TCP Forwarder Performance", IEEE/ACM Transactions on Networking, vol. 8, No. 2, Apr. 2000.

*Primary Examiner* — Quang N Nguyen
(74) *Attorney, Agent, or Firm* — Carr & Ferrell LLP

(57) ABSTRACT

Allocation of buffers for a TCP proxy session between a client and a server by a service gateway includes: monitoring dynamic network behaviors for server and client side sessions of the TCP proxy session; and allocating capacity for a server side buffer and capacity for a client side buffer in a memory buffer based on the dynamic server side network behaviors, the dynamic client side network behaviors, and a weighted average of a capacity of the memory buffer. In one approach to the allocation, the gateway determines whether an available capacity of the server or client side buffer is sufficient to store a data packet. If not sufficient, the allocated capacity of the server or client side buffer is increased based on measurements of the dynamic network behaviors and the weighted average, and the available capacity of the server or client side buffer is adjusted accordingly.

24 Claims, 11 Drawing Sheets

Data Network 153
Service Gateway 300
Computer Readable Medium 340
Processor 310
Service Application 350
Network Module 330
Memory Module 320
Client Side Network Behavior 410
Memory Buffer 327
Server Side Network Behavior 460
Client Side Send Buffer 424
Server Side Receive Buffer 474
TCP Session 420
TCP Session 470
Client Device 100
TCP Proxy Session 400
Server 200

(56) References Cited

U.S. PATENT DOCUMENTS 7,467,202 B2 * 12/2008 Savchuk ........................ 726/26
7,506,360 B1 3/2009 Wilkinson et al.
7,512,980 B2 3/2009 Copeland et al.
7,533,409 B2 5/2009 Keane et al.
7,552,323 B2 6/2009 Shay
7,590,736 B2 * 9/2009 Hydrie et al. ................ 709/226
7,613,822 B2 * 11/2009 Joy et al. ...................... 709/235
7,673,072 B2 3/2010 Boucher et al.
7,675,854 B2 3/2010 Chen et al.
7,881,215 B1 2/2011 Daigle et al.
8,090,866 B1 * 1/2012 Bashyam et al. ............ 709/232
8,185,651 B2 * 5/2012 Moran et al. ................. 709/224
8,191,106 B2 5/2012 Choyi et al.
8,312,507 B2 11/2012 Chen et al.
2002/0032777 A1 3/2002 Kawata et al.
2002/0091844 A1 7/2002 Craft et al.
2002/0103916 A1 8/2002 Chen et al.
2002/0143991 A1 10/2002 Chow et al.
2002/0194350 A1 12/2002 Lu et al.
2003/0014544 A1 1/2003 Pettey
2003/0023873 A1 1/2003 Ben-Itzhak
2003/0035409 A1 2/2003 Wang et al.
2003/0131245 A1 7/2003 Linderman
2003/0135625 A1 7/2003 Fontes et al.
2003/0195962 A1 10/2003 Kikuchi et al.
2004/0111516 A1 6/2004 Cain
2004/0187032 A1 9/2004 Gels et al.
2004/0199646 A1 10/2004 Susai et al.
2004/0202182 A1 10/2004 Lund et al.
2005/0009520 A1 1/2005 Herrero et al.
2005/0036501 A1 2/2005 Chung et al.
2005/0102400 A1 5/2005 Nakahara et al.
2005/0240989 A1 10/2005 Kim et al.
2006/0023721 A1 2/2006 Miyake et al.
2006/0069804 A1 3/2006 Miyake et al.
2006/0077926 A1 4/2006 Rune
2006/0168319 A1 7/2006 Trossen
2006/0187901 A1 8/2006 Cortes et al.
2006/0190997 A1 8/2006 Mahajani et al.
2006/0251057 A1 11/2006 Kwon et al.
2006/0277303 A1 12/2006 Hegde et al.
2006/0280121 A1 12/2006 Matoba
2007/0019543 A1 1/2007 Wei et al.
2007/0118881 A1 5/2007 Mitchell et al.
2007/0156919 A1 7/2007 Potti et al.
2007/0185998 A1 8/2007 Touitou et al.
2007/0195792 A1 8/2007 Chen et al.
2007/0283429 A1 12/2007 Chen et al.
2007/0288247 A1 12/2007 Mackay
2007/0294209 A1 12/2007 Strub et al.
2008/0101396 A1 5/2008 Miyata
2008/0109452 A1 5/2008 Patterson
2008/0109870 A1 5/2008 Sherlock et al.
2008/0250099 A1 10/2008 Shen et al.
2009/0070470 A1 3/2009 Bauman et al.
2009/0092124 A1 4/2009 Singhal et al.
2009/0138945 A1 * 5/2009 Savchuk .......................... 726/4
2009/0141634 A1 6/2009 Rothstein et al.
2009/0172093 A1 7/2009 Matsubara
2010/0061319 A1 3/2010 Aso et al.
2010/0064008 A1 3/2010 Yan et al.
2010/0083076 A1 4/2010 Ushiyama
2010/0106833 A1 4/2010 Banerjee et al.
2010/0106854 A1 4/2010 Kim et al.
2010/0217793 A1 8/2010 Preiss
2010/0223630 A1 9/2010 Degenkolb et al.
2010/0228819 A1 9/2010 Wei
2010/0235880 A1 9/2010 Chen et al.
2010/0318631 A1 12/2010 Shukla
2010/0333101 A1 12/2010 Pope et al.
2011/0007652 A1 1/2011 Bai
2011/0029599 A1 2/2011 Pulleyn et al.
2011/0032941 A1 2/2011 Quach et al.
2011/0040826 A1 2/2011 Chadzelek et al.
2011/0093522 A1 4/2011 Chen et al.
2011/0145324 A1 6/2011 Reinart et al.
2011/0191773 A1 8/2011 Pavel et al.
2011/0289496 A1 11/2011 Steer
2012/0084419 A1 4/2012 Kannan et al.
2012/0144015 A1 6/2012 Jalan et al.
2013/0100958 A1 4/2013 Jalan et al.
2013/0136139 A1 5/2013 Zheng et al.
2013/0166762 A1 6/2013 Jalan et al.
2013/0176854 A1 * 7/2013 Chisu et al. .................. 370/241

FOREIGN PATENT DOCUMENTS

EP 1885096 A1 2/2008
KR 10-0830413 B1 5/2008
WO 01/13228 A2 2/2001
WO 0149770 A2 4/2011
WO 2011149796 A2 12/2011
WO 2012075237 A2 6/2012
WO 2013070391 A1 5/2013
WO 2013081952 A1 6/2013
WO 2013096019 A1 6/2013

* cited by examiner

METHOD TO ALLOCATE BUFFER FOR TCP PROXY SESSION BASED ON DYNAMIC NETWORK CONDITIONS

BACKGROUND OF THE INVENTION

1. Field

This invention relates generally to data communications, and more specifically, to a service gateway.

2. Background

Many service gateways such as firewalls and server load balancers provide Transmission Control Protocol (TCP) proxy functionality for some time. Typical uses of TCP proxy include network analysis, security, and traffic adaptation due to asymmetric client and server condition. A TCP proxy server typically allocates a fix amount of memory buffer to handle the data packet buffering of a TCP proxy session between a client device and a server. The memory buffer is used to handle data packet buffers for client side session and server side session. The allocation of memory space among the client side session send and receive buffers, and server side session send and receive buffers does not often take performance into consideration. Common allocation methods include equally dividing the memory buffer among the session send and receive buffers, or a fix weighted average between the send and receive buffers, such as two to one ratio between server side receive buffer and client side send buffer.

Although TCP proxy is known for some time, it has not been used in any significant way. The correlation between the buffer allocation method and the performance of the TCP proxy session is not well understood. Today, many service gateway applications such as HTTP proxy, content filtering applications, advanced server load balancing methods, are deployed widely. Performance of these applications is in part depending on the performance of the TCP proxy session buffer allocation method.

Due to the different and dynamic network characteristics of client devices and servers, a pre-determined allocation of buffer spaces does not perform well on different network conditions. Therefore there is a need to allocate buffer spaces for a TCP proxy session based on one or more dynamic network conditions.

BRIEF SUMMARY OF THE INVENTION

According to one embodiment of the present invention, a method for allocating buffers for a TCP proxy session between a client and a server by a service gateway comprising a processor, comprises: monitoring, by the processor, dynamic server side network behaviors for a server side session of the TCP proxy session and dynamic client side network behaviors for a client side session of the TCP proxy session; and allocating, by the processor, capacity for a server side buffer and capacity for a client side buffer in a memory buffer based on the dynamic server side network behaviors, the dynamic client side network behaviors, and a weighted average of a capacity of the memory buffer.

In one aspect of the present invention, the allocating comprises: calculating a maximum capacity for the server side buffer and a maximum capacity for the client side buffer based on the dynamic server side network behaviors, the dynamic client side network behaviors, and the weighted average of the capacity of the memory buffer; and allocating the capacity for the server side buffer and the capacity for the client side buffer based on the maximum capacity for the server side buffer and the maximum capacity for the client side buffer.

In one aspect of the present invention, the allocating comprises: receiving a server side session data from the server, or receiving a client side session data packet from the client; determining whether an available capacity of the server side buffer is sufficient to store the server side session data packet, or determining whether an available capacity of the client side buffer is sufficient to store the client side session data packet; in response to determining that the available capacity of the server side buffer is not sufficient to store the server side session data packet, increasing the allocated capacity of the server side buffer, or in response to determining that the available capacity of the client side buffer is not sufficient to store the client side session data packet, increasing the allocated capacity of the client side buffer; and adjusting the available capacity of the server side buffer according to the increase of the allocated capacity of the server side buffer, or adjusting the available capacity of the client side buffer according to the increase of the allocated capacity of the client side buffer.

In one aspect of the present invention, the increasing comprises: in response to determining that the available capacity of the server side buffer is not sufficient to store the server side session data packet, determining whether the allocated capacity of the server side buffer is smaller than a maximum capacity of the server side buffer, or in response to determining that the available capacity of the client side buffer is not sufficient to store the client side session data packet, determining whether the allocated capacity of the client side buffer is smaller than a maximum capacity of the client side buffer; and in response to determining that the allocated capacity of the server side buffer is smaller than the maximum capacity of the server side buffer, determining whether there is sufficient memory space within the maximum capacity of the server side buffer to store the server side session data packet, or in response to determining that the allocated capacity of the client side buffer is smaller than the maximum capacity of the client side buffer, determining whether there is sufficient memory space within the maximum capacity of the client side buffer to store the client side session data packet; in response to determining that there is sufficient memory space within the maximum capacity of the server side buffer to store the server side session data packet, allocating the memory space to the server side buffer and adjusting the available capacity of the server side buffer according to the allocated memory space, or in response to determining that there is sufficient memory space within the maximum capacity of the client side buffer to store the client side session data packet, allocating the memory space to the client side buffer and adjusting the available capacity of the client side buffer according to the allocated memory space.

In one aspect of the present invention, the monitoring and the calculating comprises: measuring a server side data packet round trip time (RTT) and a client side data packet RTT; and calculating the maximum capacity for the server side buffer and the maximum capacity for the client side buffer using the server side data packet RTT, the client side RTT, and the weighted average of the capacity of the memory buffer.

In one aspect of the present invention, the weighted average of the capacity of the memory buffer is biased toward the server in calculating the maximum capacity for the server side buffer, or wherein the weighted average of the capacity of the memory buffer is biased toward the client in calculating the maximum capacity for the client side buffer.

In one aspect of the present invention, the monitoring further comprises: obtaining new measurements for the server side data packet RTT and the client side data packet RTT; and modifying the maximum capacity for the server side buffer and the maximum capacity for the client side buffer using the new server side data packet RTT, the new client side data packet RTT, and the weighted average of the capacity of the memory buffer.

In one aspect of the present invention, the measuring and the calculating comprises: measuring the server side data packet RTT, the client side data packet RTT, a server side transmission rate, and a client side transmission rate; and calculating the maximum capacity for the server side buffer and the maximum capacity for the client side buffer using the server side data packet RTT, the client side RTT, the server side transmission rate, the client side transmission rate, and the weighted average of the capacity of the memory buffer.

In one aspect of the present invention, the monitoring further comprises: obtaining new measurements for the server side transmission rate and the client side transmission rate; and modifying the maximum capacity for the server side buffer and the maximum capacity for the client side buffer using the server side data packet RTT, the client side data packet RTT, the new server side transmission rate, the new client side transmission rate, and the weighted average of the capacity of the memory buffer.

System and computer program products corresponding to the above-summarized methods are also described and claimed herein.

DETAILED DESCRIPTION OF THE INVENTION

Figure 1:
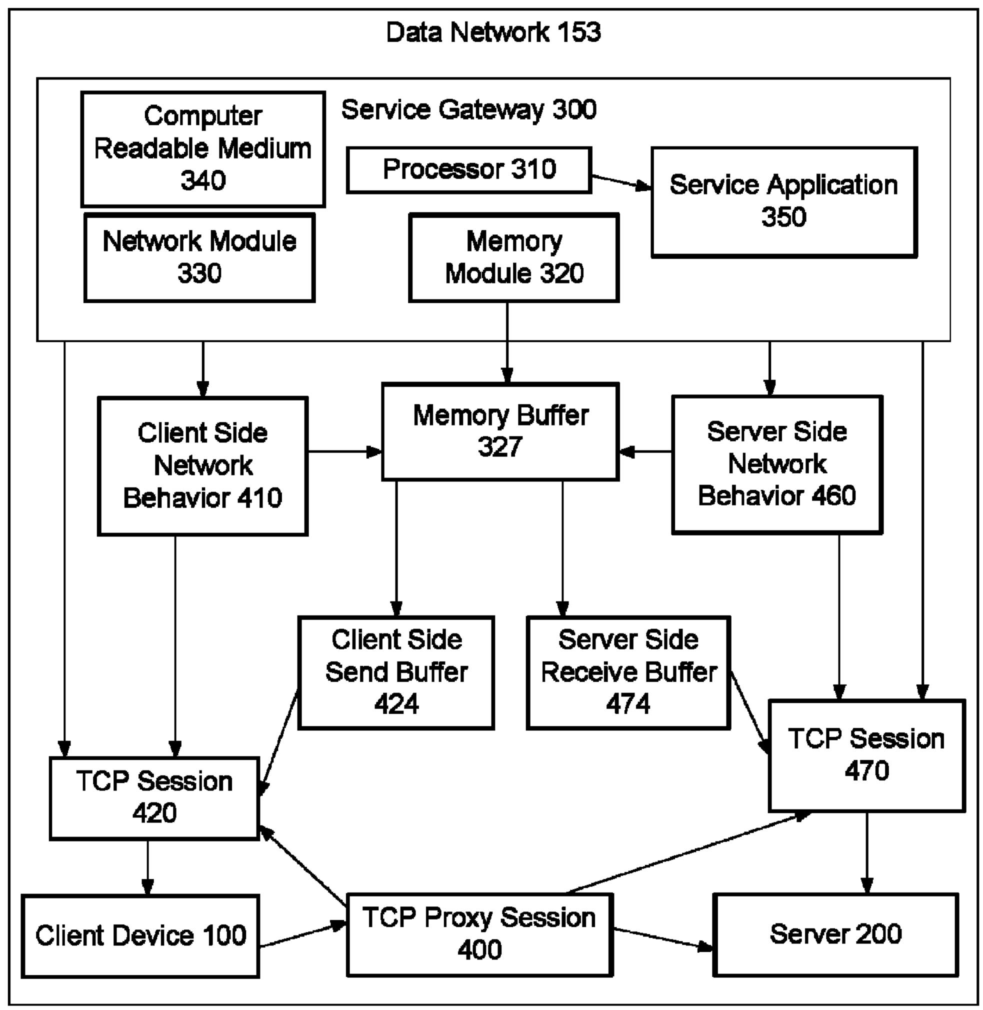
FIG. 1 illustrates an embodiment of a service gateway servicing a TCP proxy session between a client device and a server according to the present invention.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a service gateway 300 servicing a TCP proxy session 400 between a client device 100 and server device 200 via a data network 153.

In one embodiment, data network 153 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 153 resides in a data center, or connects to a network or application network cloud.

Client device 100 is typically a computing device with network access capabilities. In one embodiment, client device 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, a networked handheld gaming device, or a media center.

In one embodiment, client device 100 is a residential broadband gateway, a business Internet gateway, a business Web proxy server, a network customer premise device (CPE), or an Internet access gateway.

In one embodiment, client device 100 includes a broadband remote access server (BRAS), a Digital Subscriber Line Access Multiplexer (DSLAM), a Cable Modem Terminating System (CMTS), or a service provider access gateway.

In one embodiment, client device 100 includes a mobile broadband access gateway such as a Gateway GPRS Support Node (GGSN), a Home Agent (HA), or a PDN Gateway (PGW).

In one embodiment, client device 100 includes a server load balancer, an application delivery controller, a traffic manager, a firewall, a VPN server, a remote access server, or an enterprise or datacenter access gateway.

In one embodiment, client device 100 is a device that performs functions similar to service gateway 300.

Client device 100 initiates TCP session 400 towards server 200 via service gateway 300.

Server 200 is a computing device typically coupled to a processor and a computer readable medium which stores computer readable program code. Server 200, with the processor and the computer readable program code, implements functionality of a Web server, a file server, a video server, a database server, an application server, a voice system, a conferencing server, a media gateway, a media center, an app server or a network server providing a TCP-based service or an application service to client device 100 using the TCP session 400.

In one embodiment, server 200 is a device that performs functions similar to service In one embodiment, TCP session 400 includes a HTTP session, a FTP file transfer session, a TCP-based video streaming session, a TCP-based music streaming session, a file download session, a group conferencing session, a database access session, a remote terminal access session, a Telnet session, an e-commerce transaction, a remote procedure call, or an TCP-based network communication sessions.

Service gateway 300 is operationally coupled to a processor 310, a memory module 320, a network interface module 330, and a computer readable medium 340. The computer readable medium 340 stores computer readable program code, which when executed by the processor 310 using the memory module 320, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HTTP server, a network address translation (NAT) gateway, or a TCP proxy server.

In one embodiment of servicing TCP proxy session 400 between client device 100 and server 200, service gateway 300 establishes a client side TCP session 420 with client device 100, and a server side TCP session 470 with server 200.

In one embodiment, computer readable medium 340 includes instructions for a service application 350 and processor 310 executes service application 350.

In one embodiment, service application 350 implements functionality of a VPN firewall, a gateway security application, a HTTP proxy, a TCP-based audio or video streaming session proxy, a Web session proxy, content filtering, server load balancing, firewall, or a network application session proxy.

In one embodiment, service gateway 300 includes a memory buffer 327 for processing TCP proxy session 400. In one embodiment, memory buffer 327 capacity is pre-determined, for example 1 MB, 400 KB, 200 KB or 2 MB. In an embodiment, service gateway 300 reserves a portion of memory module 320 as memory buffer 327 to process TCP proxy session 400.

In one embodiment, service gateway 300 allocates a client side send buffer 424 for client side TCP session 420 and a server side receive buffer 474 for server side TCP session 470, where client side send buffer 424 and server side receive buffer 474 reside in memory buffer 327.

In one embodiment, service gateway 300 monitors a dynamic server side network behavior 460 for server side session 470 and a dynamic client side network behavior 410 for client side session 420. Service gateway 300 allocates client side send buffer 424 and allocates server side receive buffer 474 based on network behavior 410 and network behavior 460.

Figure 2A:
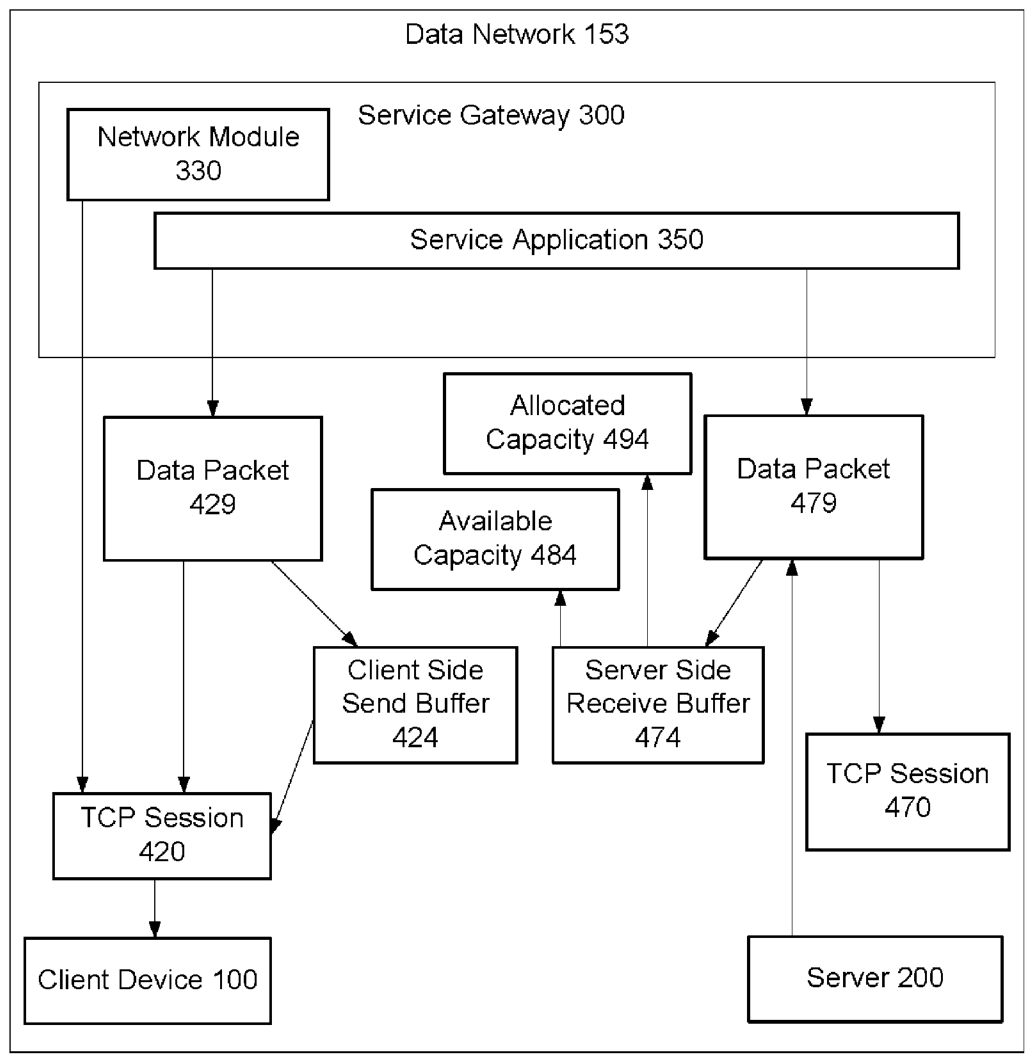
FIG. 2*a* illustrates an embodiment of a service gateway receiving a data packet from server according to the present invention.

In one embodiment as illustrated in FIG. 2*a*, service gateway 300 receives a data packet 479 of server side TCP session 470 from server 200. Service gateway 300 stores data packet 479 in server side receive buffer 474. Service application 350 retrieves data packet 479 from server side receive buffer 474 and processes data packet 479. In one embodiment, service application 350 creates a data packet 429 using data packet 479. Service application 350 sends data packet 429 to client device 100, by placing data packet 429 into client side send buffer 424. Service gateway 300 instructs network module 330 to transmit data packet 429 from client side send buffer 424 to client device 100.

In one embodiment, service gateway 300 determines that available capacity 484 of server side receive buffer 474 is sufficient to store data packet 479. Service gateway 300 stores data packet 479 into server side receive buffer 474 and reduces available capacity 484 by the amount of memory space necessary to store data packet 479.

In one embodiment, service gateway 300 determines available capacity 484 is not sufficient, service gateway 300 increases the allocated capacity 494 of server side receive buffer 474, and adjusts available capacity 484 according to the increase of allocated capacity 494. If the adjusted available capacity 484 is sufficient, service gateway 300 stores data packet 479 into server side receive buffer 474 and reduces available capacity 484 according to the memory space necessary to store data packet 479.

In one embodiment where service gateway 300 determines available capacity 484 is insufficient, even after adjustment, service gateway 300 discards data packet 479.

In one embodiment, service application 350 retrieves data packet 479 from server side receive buffer 474. Service gateway 300 removes data packet 479 from server side receive buffer 474 and increases available capacity 484 according to the memory space consumed by data packet 479.

Figure 2B:
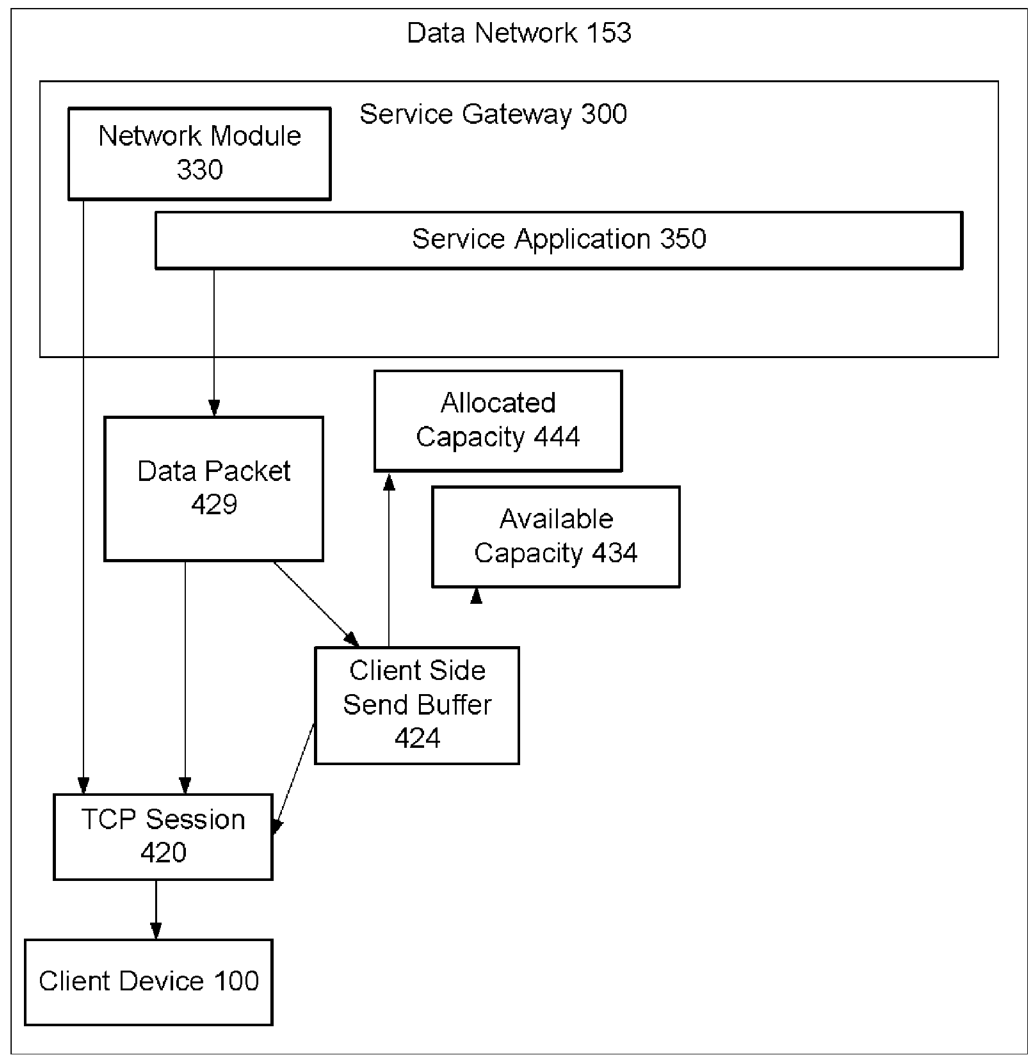
FIG. 2*b* illustrates an embodiment of a service gateway sending a data packet to client device according to the present invention.

In one embodiment as illustrated in FIG. 2*b*, before service gateway 300 stores data packet 429 into client side send buffer 424, service gateway 300 checks if an available capacity 434 of client side send buffer 424 is sufficient to store data packet 429. If the check is affirmative, service gateway 300 stores data packet 429 into client side send buffer 424 and reduces available capacity 434 according to the memory space necessary to store data packet 429.

In one embodiment, service gateway 300 determines available capacity 434 is not sufficient, service gateway 300 increases allocated capacity 444 of client side send buffer 424, and adjusts available capacity 434 according to the increase of allocated capacity 444. If the adjusted available capacity 434 is sufficient, service gateway 300 stores data packet 429 into client side send buffer 424 and reduces available capacity 434 according to the memory space necessary to store data packet 429.

In one embodiment where service gateway 300 determines available capacity 434 is insufficient, even after adjustment, service gateway 300 discards data packet 429. In one embodiment, service gateway 300 waits until available capacity 434 becomes sufficient after adjustment.

In one embodiment, network module 330 successfully transmits data packet 429 from client side send buffer 424. Service gateway 300 removes data packet 429 from client side send buffer 424 and increases available capacity 434 according to the memory space consumed by data packet 429.

Figure 3:
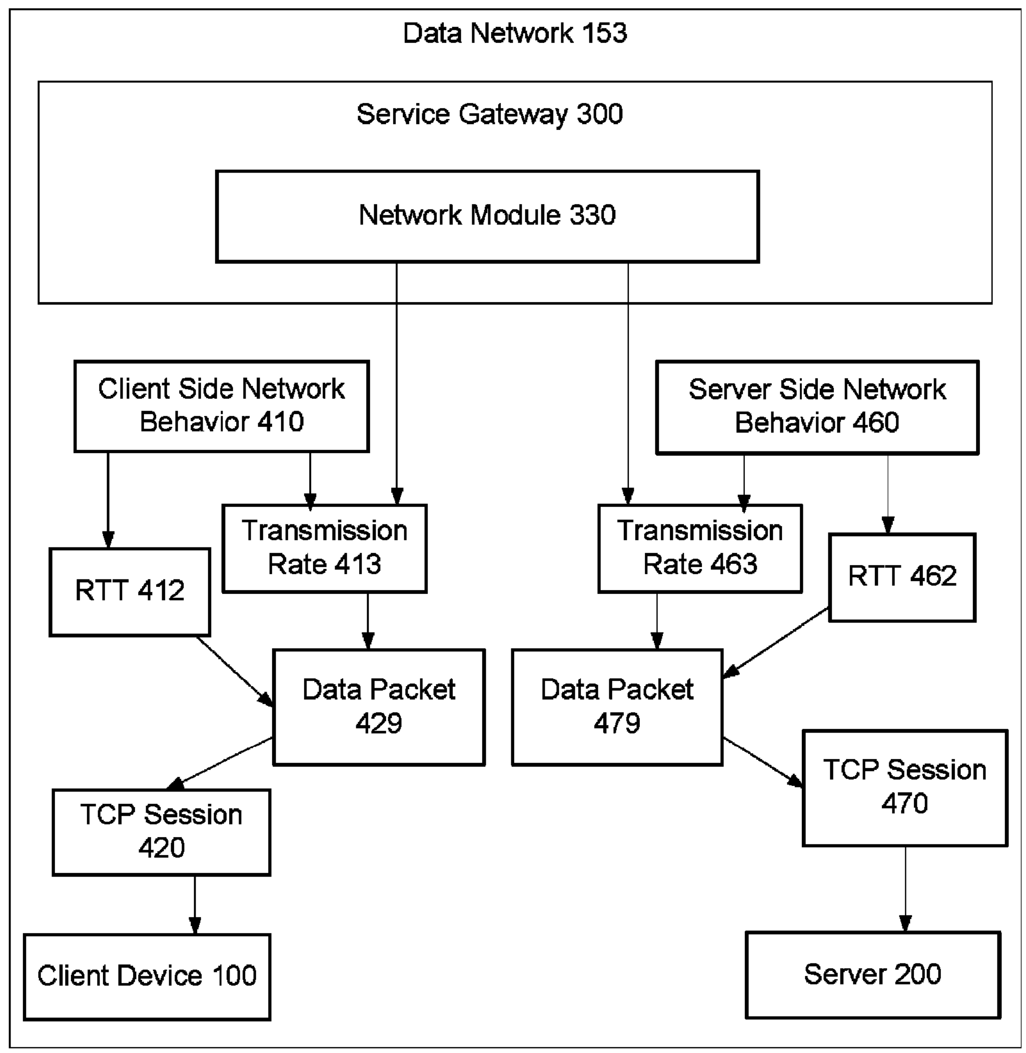
FIG. 3 illustrates an embodiment of a service gateway monitoring a server side network behavior and a client side network behavior according to the present invention.

In an embodiment illustrated in FIG. 3, service gateway 300 monitors dynamic network behavior 460 for server side session 470. In one embodiment, network behavior 460 includes a server side data packet round trip time (RTT) 462, a server side transmission rate 463, or a dynamic server side network attribute that affects service gateway 300 receiving data packet 479. In one embodiment, server side RTT 462 affects the time data packet 479 is transmitted through data network 153. In one embodiment, server side transmission rate 463 affects the rate of receiving data packet 479 by network module 330. In one embodiment, RTT 462 and transmission rate 463 are related.

Service gateway 300 measures or estimates server side RTT 462 for server side session 470. In one example embodiment, service gateway 300 measures server side RTT 462 based on a duration between a time service gateway 300 sending a data packet of server side session 470 to server 200 and a time service gateway 300 receiving an acknowledgement for the sent data packet. In one embodiment, service gateway 300 measures RTT 462 from time to time during server side TCP session 470. In one embodiment, service gateway 300 estimates server side RTT 462 based on one or more prior server side TCP sessions with server 200. In one embodiment, service gateway 300 estimates server side RTT 462 to be 10 milliseconds, 100 milliseconds, 3 milliseconds, 22 milliseconds, or 3 seconds.

In one embodiment, service gateway 300 calculates server side transmission rate 463 as a bandwidth of a network interface used by network module 330 to receive data packets of server side TCP session 470. In one embodiment, server side transmission rate 463 is the bandwidth of a virtual network interface. In one embodiment, service gateway 300 calculates server side transmission rate 463 by calculating one or more transmission rate of one or data packets of server side TCP session 470 over a period of time. In one embodiment, service gateway 300 calculates a new transmission rate 463 from time to time. In one embodiment, service gateway 300 calculates server side transmission rate 463 to be 1 Mbps, 43 Mbps, 100 Mbps, 1 Gbps, 600 Mbps, 25 Mbps or 10 Gbps.

In one embodiment, service gateway 300 monitors dynamic network behavior 410 of client side session 420. In one embodiment, network behavior 410 includes a client side data packet round trip time (RTT) 412, a client side transmission rate 413, or a dynamic network attribute that affects service gateway 300 sending data packet 429. In one embodiment, client side RTT 412 affects the time data packet 429 is transmitted through data network 153. In one embodiment, client side transmission rate 413 affects the rate of sending data packet 429 by network module 330. In one embodiment, RTT 412 and transmission rate 413 are related.

Service gateway 300 measures or estimates client side RTT 412. In one example embodiment, service gateway 300 measures client side RTT 412 based on a duration between a time service gateway 300 sending a data packet of client side session 420 to client device 100 and a time service gateway 300 receiving an acknowledgement for the sent data packet. In one embodiment, service gateway 300 measures RTT 412 from time to time during client side TCP session 420. In one embodiment, service gateway 300 estimates client side RTT 412 based on one or more prior server side TCP sessions with client device 100. In one embodiment, service gateway 300 estimates server side RTT 462 to be 10 milliseconds, 100 milliseconds, 3 milliseconds, 22 milliseconds, or 3 seconds.

In one embodiment, service gateway 300 calculates client side transmission rate 413 as a bandwidth of a network interface used by network module 330 to transmit data packets of client side TCP session 420. In one embodiment, client side transmission rate 413 is the bandwidth of a virtual network interface. In one embodiment, service gateway 300 calculates client side transmission rate 413 by calculating one or more transmission rate of one or data packets of client side TCP session 420 over a period of time. In one embodiment, service gateway 300 calculates a new transmission rate 413 from time to time. In one embodiment, service gateway 300 calculates client side transmission rate 413 to be 1 Mbps, 43 Mbps, 100 Mbps, 1 Gbps, 600 Mbps, 25 Mbps or 10 Gbps.

Figure 4:
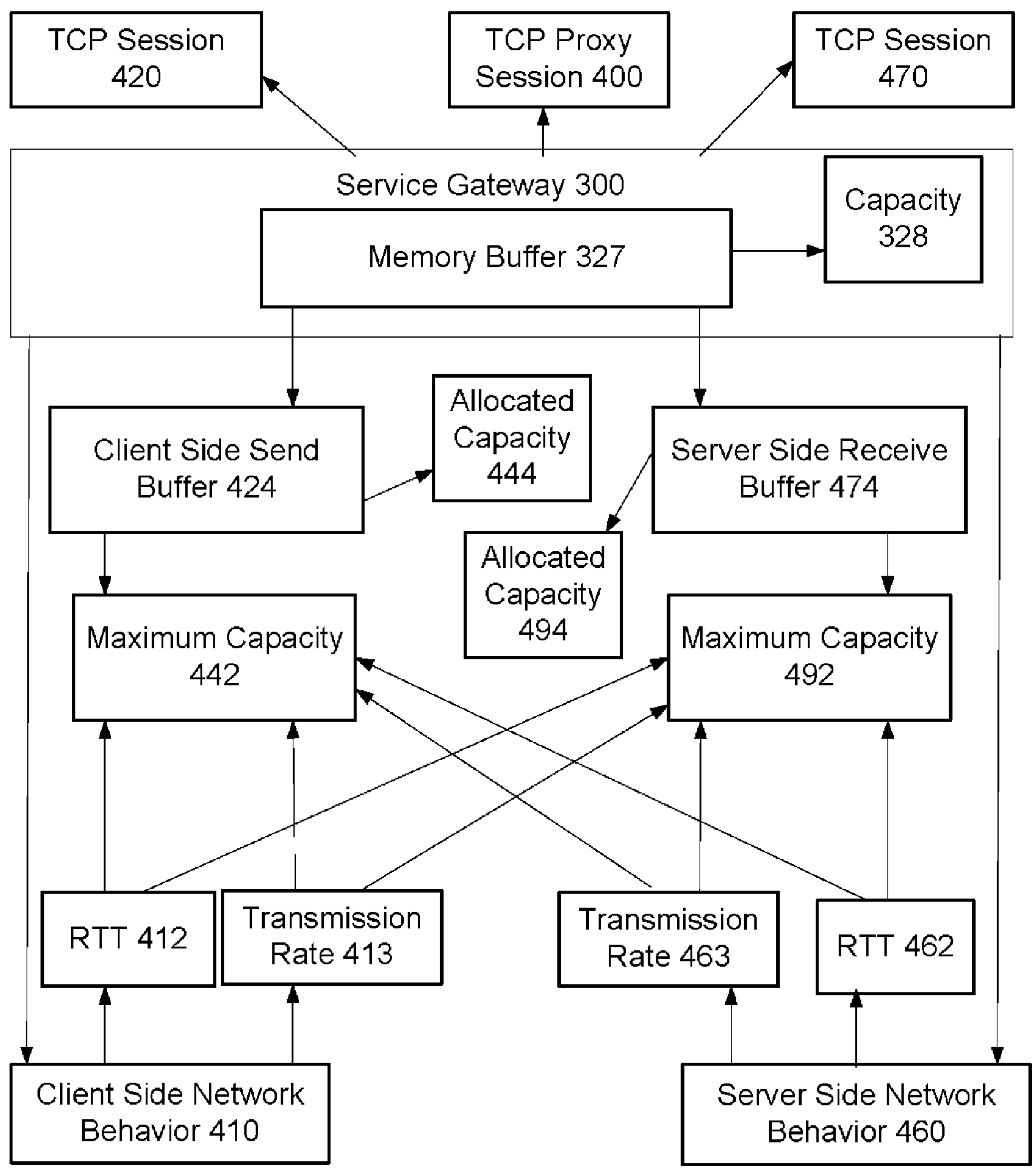
FIG. 4 illustrates an embodiment of a memory space allocation process for server side receive buffer and client side send buffer according to the present invention.

FIG. 4 illustrates an embodiment for service gateway 300 to allocate memory space from memory buffer 327 to server side receive buffer 474 and client side send buffer 424. In one embodiment, service gateway 300 reserves a portion of memory buffer 327 for server side receive buffer 474 and a portion for client side send buffer 424, when service gateway 300 starts processing TCP proxy session 400. In one embodiment, service gateway 300 starts processing TCP proxy session 400 when service gateway 300 establishes server side TCP session 470 and/or client side TCP session 420. In one embodiment, service gateway 300 allocates initially a predetermined capacity 494 of server side receive buffer 474. For example allocated capacity 494 is initially pre-determined at 10% of memory buffer 327, 8%, ⅛, or another pre-determined fraction of memory buffer 327. In another embodiment, initially allocated capacity 494 is preset to be 30 KB, 32 KB, 4 KB, 64 KB or 100 KB. Similarly service gateway 300 pre-determines the initially allocated capacity 444 of client side send buffer 424. Service gateway 300 further sets available capacity 484 of server side receive buffer 474 to be the same as allocated capacity 494, and available capacity 434 of client side send buffer 424 to be the same as allocated capacity 444.

In one embodiment, service gateway 300 calculates the maximum capacity 492 for server side receive buffer 474 and maximum capacity 442 client side send buffer 424. In one embodiment, service gateway 300 calculates using RTT 462 and RTT 412 according to equation 1 and equation 2, using a weighted average of capacity 328 of memory buffer 327 based on RTT 462 and RTT 412. The weighted average has a bias towards server side receive buffer 474.

$$\text{maximum capacity 492} = \frac{2 * RTT\ 462}{RTT\ 412 + 2 * RTT\ 462} * \text{capacity 328} \quad \text{Equation 1}$$

$$\text{maximum capacity 442} = \frac{RTT\ 412}{RTT\ 412 + 2 * RTT\ 462} * \text{capacity 328} \quad \text{Equation 2}$$

Equation 1 and equation 2 illustrate an embodiment wherein the sum of maximum capacity 492 and maximum capacity 442 equals capacity 328. In this embodiment, the factor of 2 for RTT 462 is selected such that service gateway 300 advertises ½ or half the maximum capacity 492 of server side receive buffer 474 for server side TCP session 470. It is appropriate to adjust the factor 2 with a different factor relating to the portion of server side receive buffer 474 advertised for server side TCP session 470.

In one embodiment, service gateway 300 obtains a new measurement of server side RTT 462 and/or a new measurement of client side RTT 412. Service gateway 300 applies equation 1 and equation 2 to modify maximum capacity 492 and maximum capacity 442.

In one embodiment, service gateway 300 further considers server side transmission rate 463 and client side transmission rate 413. Service gateway calculates using equation 3 and equation 4, using a weighted average of capacity 328 based on combination of transmission rate 463 and RTT 462, and transmission rate 413 and RTT 412. The weighted average has a bias towards server side receive buffer 474.

$$\text{maximum capacity 492} = \frac{2 * \text{transmission rate 463} * RTT\ 462}{\text{transmission rate 413} * RTT\ 412 + 2 * \text{transmission rate 463} * RTT\ 462} * \text{capacity 328} \quad \text{Equation 3}$$

$$\text{maximum capacity 442} = \frac{\text{transmission rate 413} * RTT\ 412}{\text{transmission rate 413} * RTT\ 412 + 2 * \text{transmission rate 463} * RTT\ 462} * \text{capacity 328} \quad \text{Equation 4}$$

Equation 3 and equation 4 illustrate an embodiment wherein the sum of maximum capacity 492 and maximum capacity 442 equals capacity 328.

In one embodiment, service gateway 300 obtains a new server side transmission rate 463 and/or a new client side transmission rate 413. Service gateway 300 applies equations 3 and 4 to modify maximum capacity 492 and maximum capacity 442. In one embodiment, service gateway 300 obtains a new measurement of server side RTT 462 and/or a new measurement of client side RTT 412. Service gateway 300 applies equation 3 and equation 4 to modify maximum capacity 492 and maximum capacity 442.

Figure 5A:
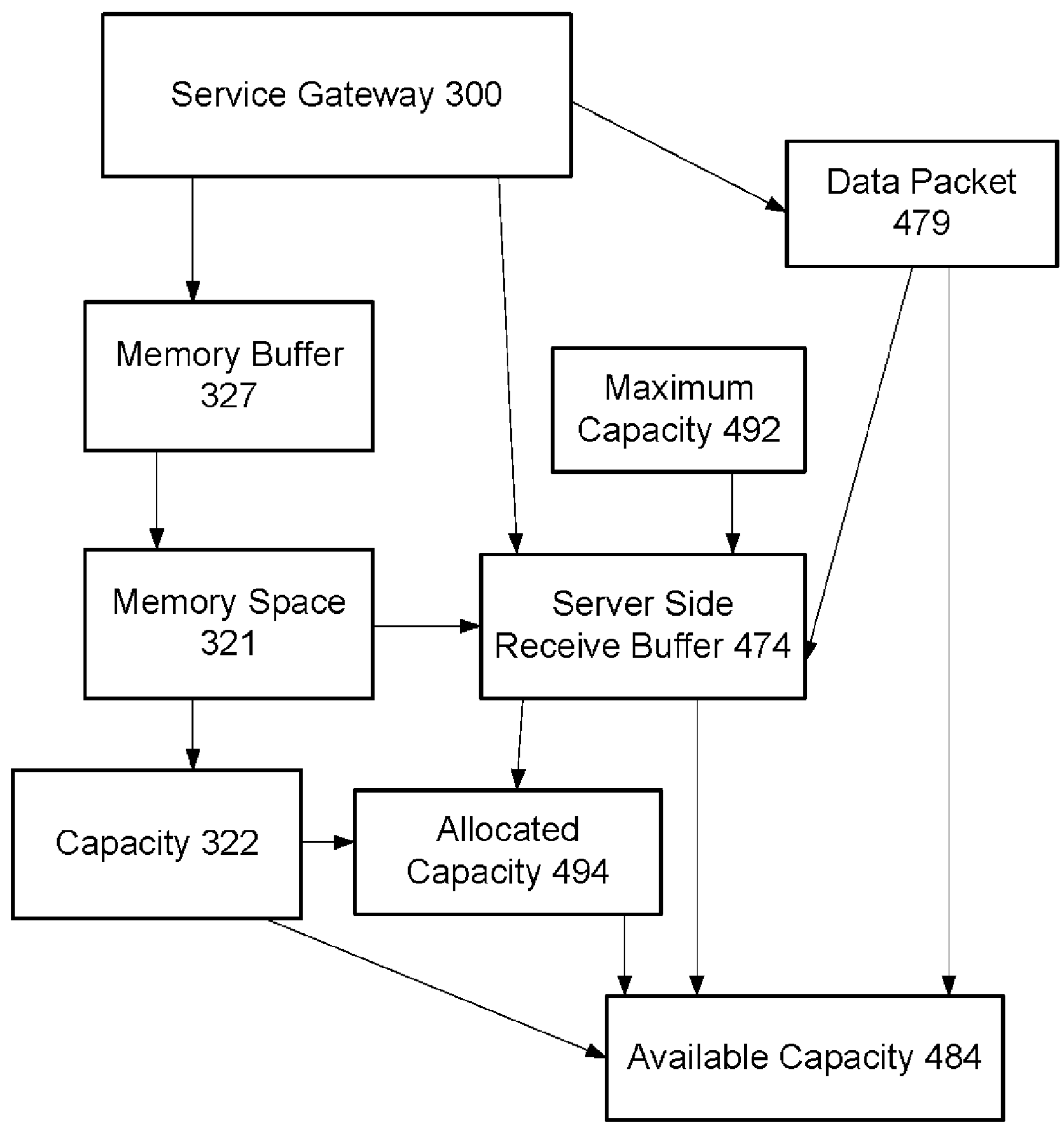
FIG. 5*a* illustrates an embodiment of a service gateway storing data packet into server side receive buffer according to the present invention.

In FIG. 5*a*, further illustrating an embodiment in FIG. 2*a* where service gateway 300 stores server side data packet 479 into server side receive buffer 474 and finds that available capacity 484 of server side receive buffer 474 is insufficient. Service gateway 300 checks if allocated capacity 494 of server side receive buffer 474 is smaller than maximum capacity 492 of server side receive buffer 474. If allocated capacity 494 is at least that of maximum capacity 492 or the difference between capacity 494 and maximum capacity 492 is smaller than the memory necessary to store data packet 479, service gateway 300 discards data packet 479.

In one embodiment, service gateway 300 determines there is sufficient memory space within maximum capacity 492 to store data packet 479. Service gateway 300 allocates a memory space 321 from memory buffer 327. In one embodiment, memory space 321 has a capacity 322. Service gateway 300 increases allocated capacity 494 of server side receive buffer 474 by an amount of capacity 322, and includes memory space 321 into server side receive buffer 474. Service gateway 300 allocates memory space 321 such that adjusted allocated capacity 494 does not exceed maximum capacity 492 of server side receive buffer 474. After storing data packet 479 into the updated server side receive buffer 474, service gateway 300 updates available capacity 484 of server side receive buffer 474 using capacity 322, and the space consumed by data packet 479.

Figure 5B:
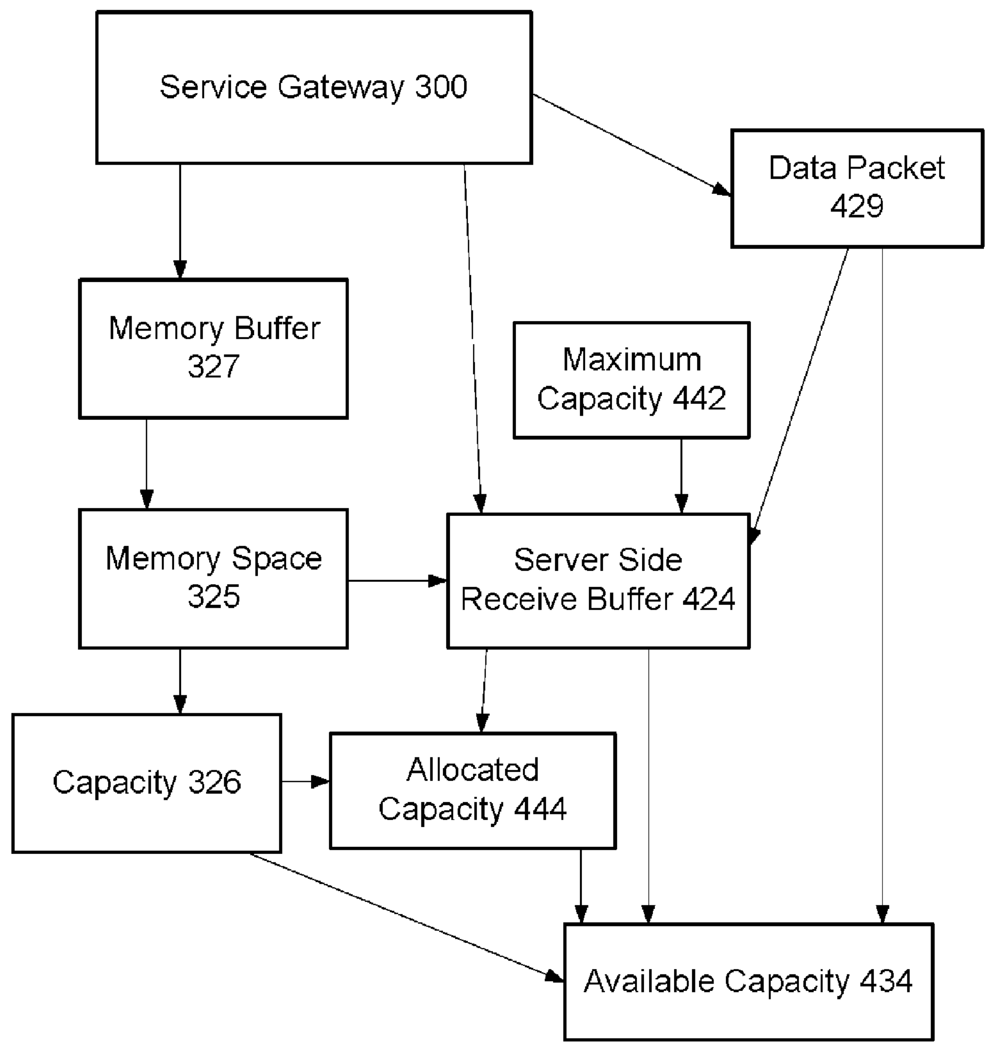
FIG. 5*b* illustrates an embodiment of a service gateway storing data packet into client side send buffer according to the present invention.

In FIG. 5*b*, further illustrating an embodiment in FIG. 2*b* where service gateway 300 stores data packet 429 into client side send buffer 424 and finds that available capacity 434 of client side send buffer 424 is insufficient. Service gateway 300 checks if allocated capacity 444 of client side send buffer 424 is smaller than maximum capacity 442 of client side send buffer 424. If capacity 444 is at least that of maximum capacity 442 or the difference between allocated capacity 444 and maximum capacity 442 is smaller than the memory necessary to store data packet 429, service gateway 300 discards data packet 429.

In one embodiment, service gateway 300 determines there is sufficient memory space within maximum capacity 442 to store data packet 429. Service gateway 300 allocates a memory space 325 from memory buffer 327. In one embodiment, memory space 325 has a capacity 326. Service gateway 300 increases allocated capacity 444 of client side send buffer 424 by an amount of capacity 326, and includes memory space 325 into client side send buffer 424. Service gateway 300 allocates memory space 325 such that adjusted allocated capacity 444 does not exceed maximum capacity 442 of client side send buffer 424. After storing data packet 429 into the updated client side send buffer 424, service gateway 300 updates available capacity 434 using capacity 326, and the space consumed by data packet 429.

Figure 6:
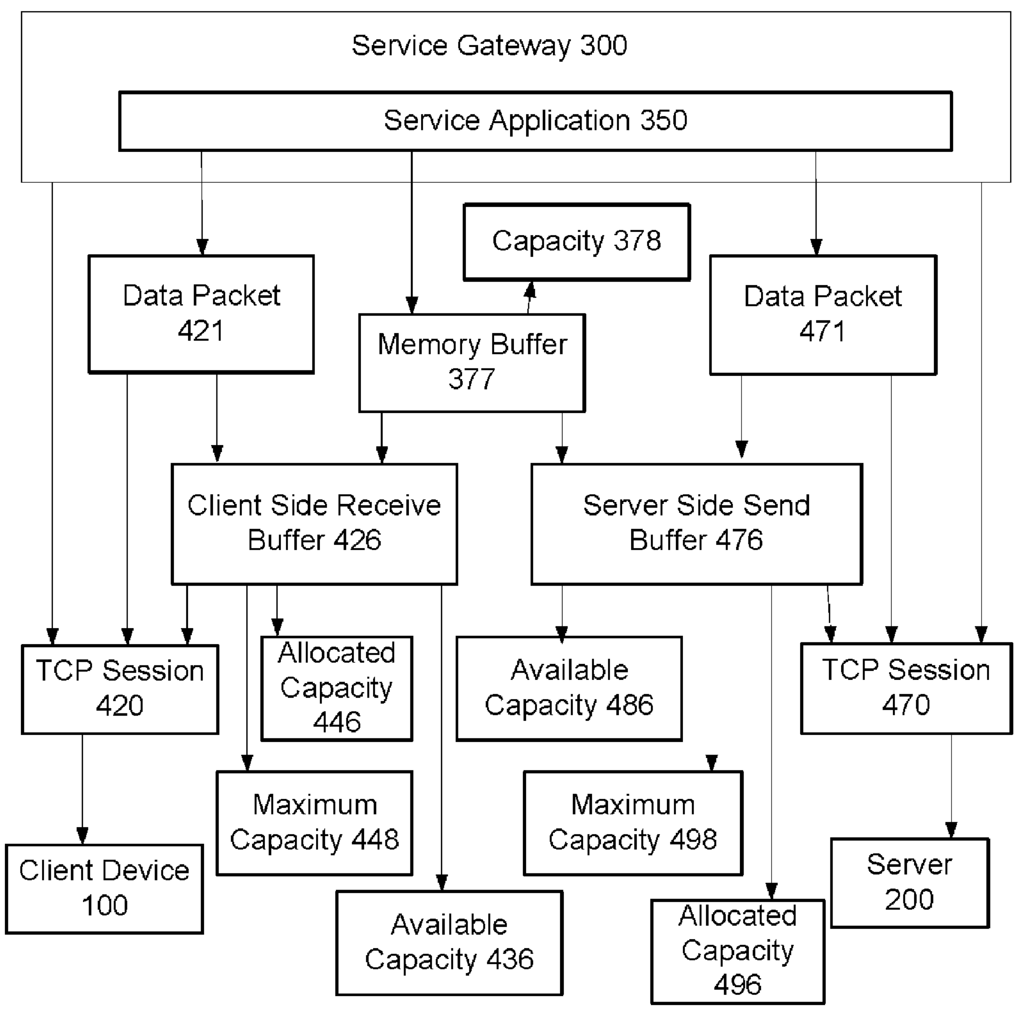
FIG. 6 illustrates an embodiment of a service gateway receiving a data packet from client device according to the present invention.

In one embodiment, client device 100 sends a data packet 421 to service gateway 300 via client side TCP session 420. As illustrated in FIG. 6, in one embodiment, service gateway 300 includes a memory buffer 377 which includes a client side receive buffer 426 and a server side send buffer 476. Memory buffer 377 is associated with a capacity 378. Client side receive buffer 426 is associated with an allocated capacity 446, an available capacity 436 and a maximum capacity 448. Server side send buffer 476 is associated with an allocated capacity 496, an available capacity 486 and a maximum capacity 498.

Service gateway 300 uses client side receive buffer 426 and server side send buffer 476 to handle data packet 421. Service gateway 300 receives data packet 421 and stores data packet 421 in client side receive buffer 426. Service application 350 retrieves data packet 421 from client side receive buffer 426, and generates a data packet 471 based on data packet 421. Service application 350 places data packet 471 in server side send buffer 476. Service gateway 300 transmits data packet 471 from server side send buffer 476 to server 200.

In one embodiment, service gateway 300 reserves a pre-determined capacity 378 of memory buffer 377 to handle TCP proxy session 400. In one embodiment, capacity 378 of memory buffer 377 is the same as capacity 328 of memory buffer 327. In one embodiment, capacity 378 is different from capacity 328.

Figure 7:
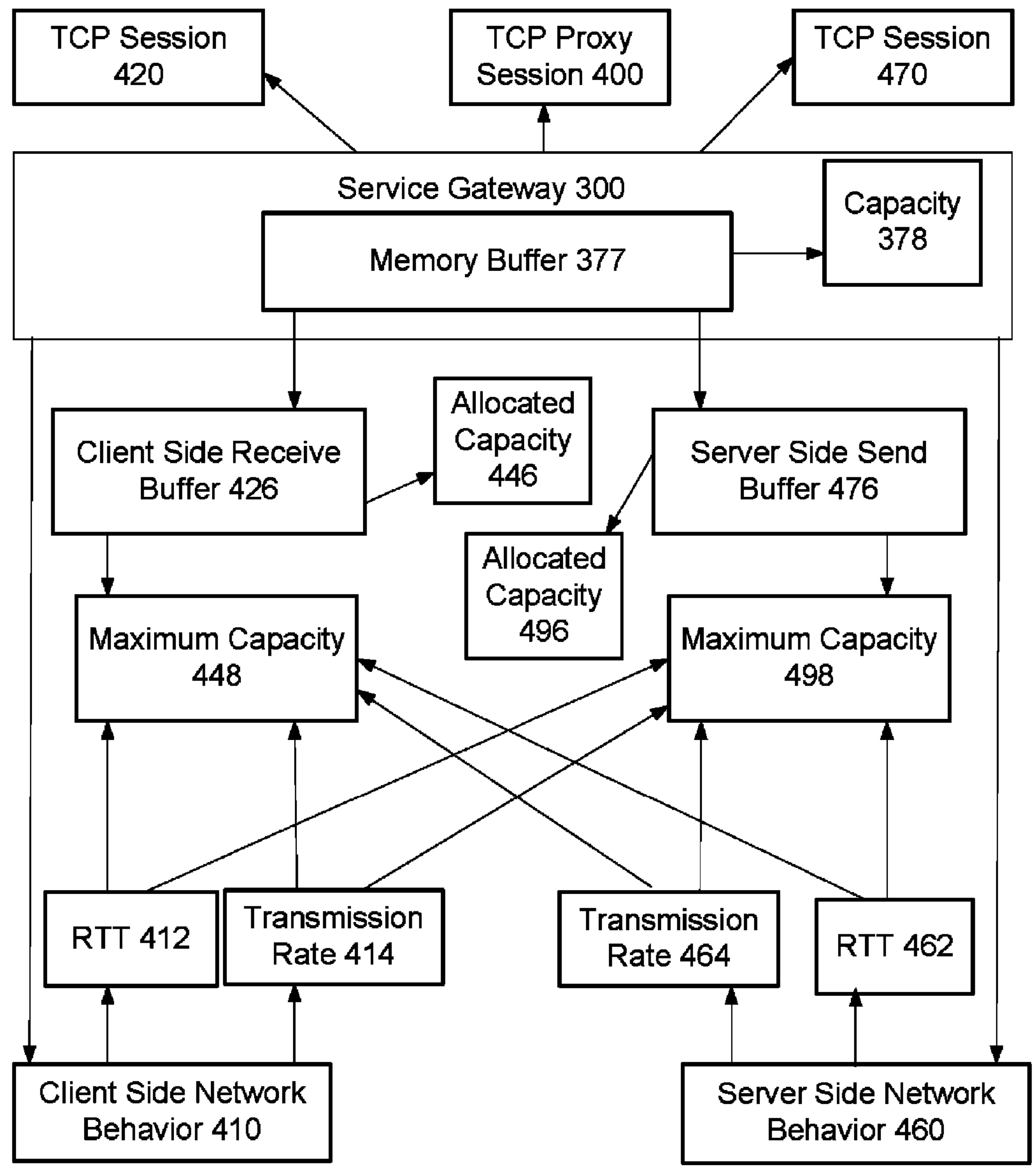
FIG. 7 illustrates an embodiment of a memory space allocation process for client side receive buffer and server side send buffer according to the present invention.

FIG. 7 illustrates an embodiment for service gateway 300 to allocate memory space from memory buffer 377 to server side send buffer 476 and client side receive buffer 426. In one embodiment, service gateway 300 reserves a portion of memory buffer 377 for server side send buffer 476 and a portion for client side receive buffer 426, when service gateway 300 starts processing TCP proxy session 400. In one embodiment, service gateway 300 starts processing TCP proxy session 400 when service gateway 300 establishes server side TCP session 470 and/or client side TCP session 420. In one embodiment, service gateway 300 allocates initially a pre-determined capacity 496 of server side send buffer 476. For example allocated capacity 496 is initially pre-determined at 10% of memory buffer 377, 8%, ⅛, or another fraction of memory buffer 377. In another embodiment, initial value of allocated capacity 496 is preset to be 30 KB, 32 KB, 4 KB, 64 KB or 100 KB. Similarly service gateway 300 pre-determines the initial allocated capacity 446 of client side receive buffer 426. Service gateway 300 further sets available capacity 486 of server side send buffer 476 to be the same as allocated capacity 496, and available capacity 436 of client side receive buffer 426 to be the same as allocated capacity 446.

In one embodiment, RTT 462 of network condition 460 affects sending of data packet 471. In one embodiment, network condition 460 includes a server side transmission rate 464. Service gateway 300 calculates server side transmission rate 464 as the bandwidth of a network interface used by network module 330 to transmit data packets of server side TCP session 470. In one embodiment, server side transmission rate 464 is the bandwidth of a virtual network interface. In one embodiment, service gateway 300 calculates server side transmission rate 464 by calculating one or more transmission rate of one or data packets of server side TCP session 470 over a period of time. In one embodiment, service gateway 300 calculates a new transmission rate 464 from time to time. In one embodiment, service gateway 300 calculates server side transmission rate 464 to be 1 Mbps, 43 Mbps, 100 Mbps, 1 Gbps, 600 Mbps, 25 Mbps or 10 Gbps.

In one embodiment, RTT 412 of network condition 410 also affects receiving of data packet 421. In one embodiment, network condition 410 includes a client side transmission rate 414. Service gateway 300 calculates client side transmission rate 414 as the bandwidth of a network interface used by network module 330 to receive data packets of client side TCP session 420. In one embodiment, client side transmission rate 414 is the bandwidth of a virtual network interface. In one embodiment, service gateway 300 calculates client side transmission rate 414 by calculating one or more transmission rate of one or data packets of client side TCP session 420 over a period of time. In one embodiment, service gateway 300 calculates a new transmission rate 414 from time to time. In one embodiment, service gateway 300 calculates client side transmission rate 414 to be 1 Mbps, 43 Mbps, 100 Mbps, 1 Gbps, 600 Mbps, 25 Mbps or 10 Gbps.

In one embodiment, service gateway 300 calculates maximum capacity 498 and maximum capacity 448, using network condition 460 and network condition 410, according to equation 5 and equation 6, using a weighted average of capacity 378 based on RTT 462 and RTT 412. The weighted average has a bias towards client side receive buffer 426.

$$\text{maximum capacity 498} = \frac{RTT\ 462}{2*RTT\ 412+RTT\ 462}*\text{capacity 378} \quad \text{Equation 5}$$

$$\text{maximum capacity 448} = \frac{2*RTT\ 412}{2*RTT\ 412+RTT\ 462}*\text{capacity 378} \quad \text{Equation 6}$$

Equation 5 and equation 6 illustrate an embodiment wherein the sum of maximum capacity 498 and maximum capacity 448 equals capacity 378. In this embodiment, the factor of 2 for RTT 412 is selected such that service gateway 300 advertises ½ or half the maximum capacity 448 of client side receive buffer 426 for client side TCP session 420. It is appropriate to adjust the factor 2 with a different factor relating to the portion of client side receive buffer 426 advertised for client side TCP session 420.

In one embodiment, service gateway 300 obtains a new measurement of server side RTT 462 and/or a new measurement of client side RTT 412. Service gateway 300 applies equation 5 and equation 6 to modify maximum capacity 498 and maximum capacity 448.

In one embodiment, service gateway 300 further considers server side transmission rate 464 and client side transmission rate 414. Service gateway calculates using equation 7 and equation 8, using a weighted average of capacity 378 based on combination of transmission rate 464 and RTT 462, and transmission rate 414 and RTT 412. The weighted average has a bias towards client side receive buffer 426.

$$\text{maximum capacity 498} = \frac{\text{transmission rate } 464*RTT\ 462}{2*\text{transmission rate } 414*RTT\ 412+\text{transmission rate } 464*RTT\ 462}*\text{capacity 378} \quad \text{Equation 7}$$

$$\text{maximum capacity 448} = \frac{2*\text{transmission rate } 414*RTT\ 412}{2*\text{transmission rate } 414*RTT\ 412+\text{transmission rate } 464*RTT\ 462}*\text{capacity 378} \quad \text{Equation 9}$$

Equation 7 and equation 8 illustrate an embodiment wherein the sum of maximum capacity 498 and maximum capacity 448 equals capacity 378.

In one embodiment, service gateway 300 obtains a new server side transmission rate 464 and/or a new client side transmission rate 414, service gateway 300 applies equation 7 and equation 8 to modify maximum capacity 498 and maximum capacity 448. In one embodiment, service gateway 300 obtains a new measurement of server side RTT 462 and/or a new measurement of client side RTT 412, service gateway 300 applies equation 7 and equation 8 to modify maximum capacity 492 and maximum capacity 442.

Figure 8A:
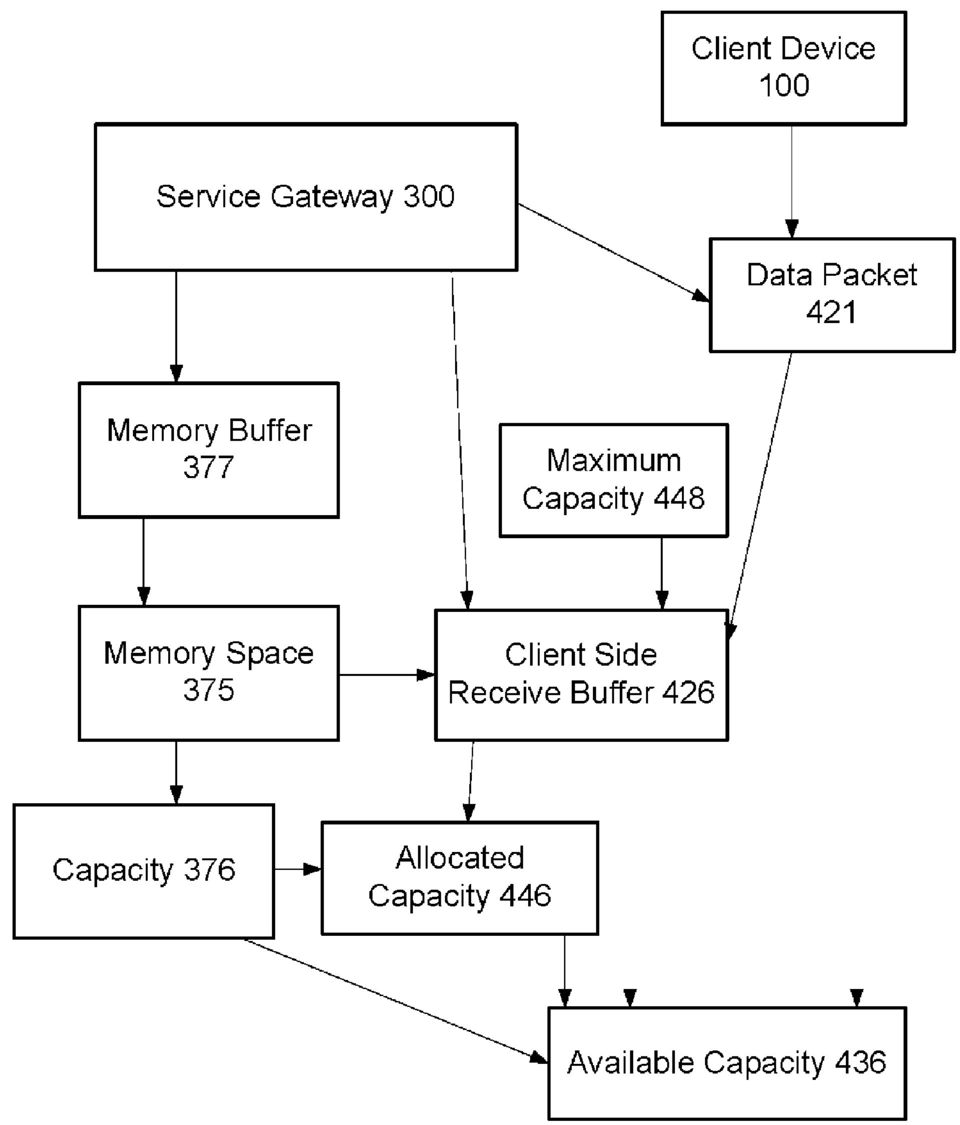
FIG. 8*a* illustrates an embodiment of a service gateway storing data packet into client side receive buffer according to the present invention.

In FIG. 8*a*, service gateway 300 receives data packet 421 from client device 100 and stores data packet 421 into client side receive buffer 426 and finds that available capacity 436 of client side receive buffer 426 is insufficient. Service gateway 300 checks if allocated capacity 446 of client side receive buffer 426 is smaller than maximum capacity 448 of client side receive buffer 426. If allocated capacity 446 is at least that of maximum capacity 448 or the difference between allocated capacity 446 and maximum capacity 448 is smaller than the memory necessary to store data packet 421, service gateway 300 discards data packet 421.

In one embodiment, service gateway 300 determines there is sufficient memory space within maximum capacity 448 to store data packet 421. Service gateway 300 allocates memory space 375 from memory buffer 377. In one embodiment, memory space 375 has a capacity 376. Service gateway 300 increases allocated capacity 446 by an amount of capacity 376, and includes memory space 375 into client side receive buffer 426. Service gateway 300 allocates memory space 375 such that adjusted allocated capacity 446 does not exceed maximum capacity 448 of client side send buffer 426. After storing data packet 421 into the updated client side receive buffer 426, service gateway 300 updates available capacity 436 of client side receive buffer 426 using capacity 376, and the space consumed by data packet 421.

Figure 8B:
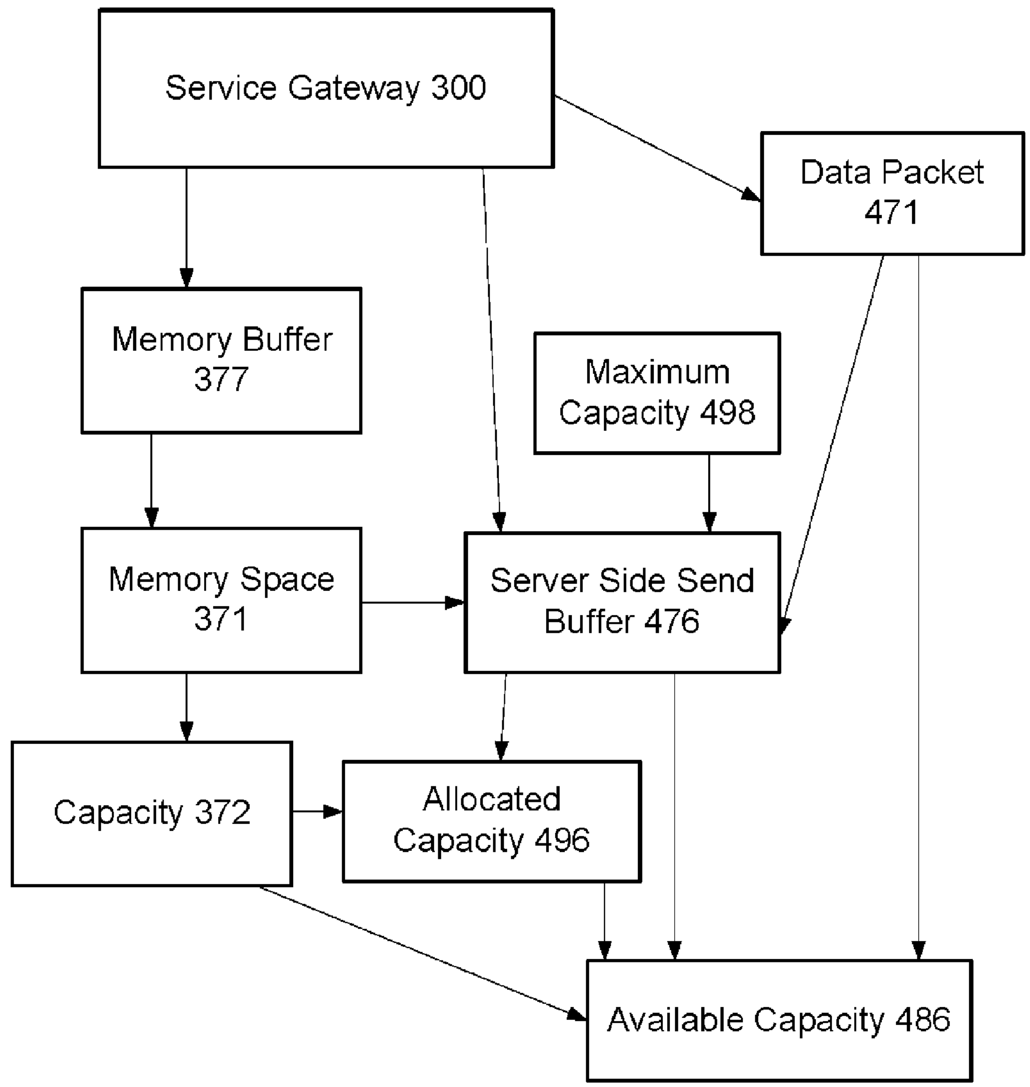
FIG. 8*b* illustrates an embodiment a service gateway storing data packet into server side send buffer according to the present invention.

In FIG. 8*b*, service gateway 300 stores data packet 471 into server side send buffer 476. In one embodiment, service gateway 300 finds that available capacity 486 of server side send buffer 476 is insufficient. Service gateway 300 checks if allocated capacity 496 of server side send buffer 476 is smaller than maximum capacity 498 of server side send buffer 476. If allocated capacity 496 is at least that of maximum capacity 498 or the difference between allocated capacity 496 and maximum capacity 498 is smaller than the memory necessary to store data packet 471, service gateway 300 discards data packet 471.

In one embodiment, service gateway 300 determines there is sufficient memory space within maximum capacity 498 to store data packet 471. Service gateway 300 allocates a memory space 371 from memory buffer 377. In one embodiment, memory space 371 has a capacity 372. Service gateway 300 increases allocated capacity 496 by an amount of capacity 372, and includes memory space 371 into server side send buffer 476. Service gateway 300 allocates memory space 371 such that adjusted allocated capacity 496 does not exceed maximum capacity 498. After storing data packet 471 into the updated server side send buffer 476, service gateway 300 updates available capacity 486 of server side send buffer 476 using capacity 372, and the space consumed by data packet 471.

In one embodiment, service application 350 retrieves data packet 471 from client side receive buffer 426. Service gateway 300 removes data packet 471 from client side receive buffer 426 and increase available capacity 436 according to the memory space consumed by data packet 471.

In one embodiment, network module 330 successfully transmits data packet 471 from server side send buffer 476. Service gateway 300 remove data packet 471 from server side send buffer 476 and increases available capacity 486 according to the memory space consumed by data packet 471.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allocating buffers for a TCP proxy session between a client and a server by a service gateway comprising a processor, comprising:

monitoring, by the processor, dynamic server side network behaviors for a server side session of the TCP proxy session and dynamic client side network behaviors for a client side session of the TCP proxy session; and allocating, by the processor, capacity for a server side buffer and capacity for a client side buffer in a memory buffer based on the dynamic server side network behaviors, the dynamic client side network behaviors, and a weighted average of a capacity of the memory buffer, the allocating comprising:

receiving a server side session data packet from the server, or receiving a client side session data packet from the client;

determining whether an available capacity of the server side buffer is sufficient to store the server side session data packet, or determining whether an available capacity of the client side buffer is sufficient to store the client side session data packet;

in response to determining that the available capacity of the server side buffer is not sufficient to store the server side session data packet, increasing the allocated capacity of the server side buffer, or in response to determining that the available capacity of the client side buffer is not sufficient to store the client side session data packet, increasing the allocated capacity of the client side buffer; and adjusting the available capacity of the server side buffer according to the increase of the allocated capacity of the server side buffer, or adjusting the available capacity of the client side buffer according to the increase of the allocated capacity of the client side buffer.

2. The method of claim 1, wherein the allocating comprises:

calculating a maximum capacity for the server side buffer and a maximum capacity for the client side buffer based on the dynamic server side network behaviors, the dynamic client side network behaviors, and the weighted average of the capacity of the memory buffer; and allocating the capacity for the server side buffer and the capacity for the client side buffer based on the maximum capacity for the server side buffer and the maximum capacity for the client side buffer.

3. The method of claim 1, wherein:

in response to determining that the available capacity of the server side buffer is not sufficient to store the server side session data packet, determining whether the allocated capacity of the server side buffer is smaller than a maximum capacity of the server side buffer, or in response to determining that the available capacity of the client side buffer is not sufficient to store the client side session data packet, determining whether the allocated capacity of the client side buffer is smaller than a maximum capacity of the client side buffer;

in response to determining that the allocated capacity of the server side buffer is smaller than the maximum capacity of the server side buffer, determining whether there is sufficient memory space within the maximum capacity of the server side buffer to store the server side session data packet, or in response to determining that the allocated capacity of the client side buffer is smaller than the maximum capacity of the client side buffer, determining whether there is sufficient memory space within the maximum capacity of the client side buffer to store the client side session data packet; and in response to determining that there is sufficient memory space within the maximum capacity of the server side buffer to store the server side session data packet, allocating the memory space to the server side buffer and adjusting the available capacity of the server side buffer according to the allocated memory space, or in response to determining that there is sufficient memory space within the maximum capacity of the client side buffer to store the client side session data packet, allocating the memory space to the client side buffer and adjusting the available capacity of the client side buffer according to the allocated memory space.

4. The method of claim 2, wherein the monitoring and the calculating comprises:

measuring a server side data packet round trip time (RTT) and a client side data packet RTT; and calculating the maximum capacity for the server side buffer and the maximum capacity for the client side buffer using the server side data packet RTT, the client side data packet RTT, and the weighted average of the capacity of the memory buffer.

5. The method of claim 4, wherein the weighted average of the capacity of the memory buffer is biased toward the server in calculating the maximum capacity for the server side buffer, or wherein the weighted average of the capacity of the memory buffer is biased toward the client in calculating the maximum capacity for the client side buffer.

6. The method of claim 4, wherein the monitoring further comprises:

obtaining new measurements for the server side data packet RTT and the client side data packet RTT; and modifying the maximum capacity for the server side buffer and the maximum capacity for the client side buffer using the new server side data packet RTT, the new client side data packet RTT, and the weighted average of the capacity of the memory buffer.

7. The method of claim 4, wherein the measuring and the calculating comprises:

measuring the server side data packet RTT, the client side data packet RTT, a server side transmission rate, and a client side transmission rate; and calculating the maximum capacity for the server side buffer and the maximum capacity for the client side buffer using the server side data packet RTT, the client side RTT, the server side transmission rate, the client side transmission rate, and the weighted average of the capacity of the memory buffer.

8. The method of claim 7, wherein the monitoring further comprises:

obtaining new measurements for the server side transmission rate and the client side transmission rate; and modifying the maximum capacity for the server side buffer and the maximum capacity for the client side buffer using the server side data packet RTT, the client side data packet RTT, the new server side transmission rate, the new client side transmission rate, and the weighted average of the capacity of the memory buffer.

9. A computer program product for allocating buffers for a TCP proxy session between a client and a server, the computer program product comprising:

a non-transitory computer readable storage medium having computer readable program code embodied therewith, the computer readable program code configured to:

monitor dynamic server side network behaviors for a server side session of the TCP proxy session and dynamic client side network behaviors for a client side session of the TCP proxy session; and allocate capacity for a server side buffer and capacity for a client side buffer in a memory buffer based on the dynamic server side network behaviors, the dynamic client side network behaviors, and a weighted average of a capacity of the memory buffer, the allocating comprising:

receiving a server side session data packet from the server, or receiving a client side session data packet from the client;

determining whether an available capacity of the server side buffer is sufficient to store the server side session data packet, or determining whether an available capacity of the client side buffer is sufficient to store the client side session data packet;

in response to determining that the available capacity of the server side buffer is not sufficient to store the server side session data packet, increase the allocated capacity of the server side buffer, or in response to determining that the available capacity of the client side buffer is not sufficient to store the client side session data packet, increase the allocated capacity of the client side buffer; and adjusting the available capacity of the server side buffer according to the increase of the allocated capacity of the server side buffer, or adjust the available capacity of the client side buffer according to the increase of the allocated capacity of the client side buffer.

10. The computer program product of claim 9, wherein the computer readable program code configured to allocate is further configured to:

calculate a maximum capacity for the server side buffer and a maximum capacity for the client side buffer based on the dynamic server side network behaviors, the dynamic client side network behaviors, and the weighted average of the capacity of the memory buffer; and allocate the capacity for the server side buffer and the capacity for the client side buffer based on the maximum capacity for the server side buffer and the maximum capacity for the client side buffer.

11. The computer program product of claim 9, wherein the computer readable program code configured to increase is further configured to:

in response to determining that the available capacity of the server side buffer is not sufficient to store the server side session data packet, determine whether the allocated capacity of the server side buffer is smaller than a maximum capacity of the server side buffer, or in response to determining that the available capacity of the client side buffer is not sufficient to store the client side session data packet, determine whether the allocated capacity of the client side buffer is smaller than a maximum capacity of the client side buffer;

in response to determining that the allocated capacity of the server side buffer is smaller than the maximum capacity of the server side buffer, determine whether there is sufficient memory space within the maximum capacity of the server side buffer to store the server side session data packet, or in response to determining that the allocated capacity of the client side buffer is smaller than the maximum capacity of the client side buffer, determine whether there is sufficient memory space within the maximum capacity of the client side buffer to store the client side session data packet; and in response to determining that there is sufficient memory space within the maximum capacity of the server side buffer to store the server side session data packet, allocate the memory space to the server side buffer and adjust the available capacity of the server side buffer according to the allocated memory space, or in response to determining that there is sufficient memory space within the maximum capacity of the client side buffer to store the client side session data packet, allocate the memory space to the client side buffer and adjust the available capacity of the client side buffer according to the allocated memory space.

12. The computer program product of claim 10, wherein the computer readable program code configured to monitor and to calculate is further configured to:

measure a server side data packet round trip time (RTT) and a client side data packet RTT; and calculate the maximum capacity for the server side buffer and the maximum capacity for the client side buffer using the server side data packet RTT, the client side data packet RTT, and the weighted average of the capacity of the memory buffer.

13. The computer program product of claim 12, wherein the weighted average of the capacity of the memory buffer is biased toward the server in calculating the maximum capacity for the server side buffer, or wherein the weighted average of the capacity of the memory buffer is biased toward the client in calculating the maximum capacity for the client side buffer.

14. The computer program product of claim 12, wherein the computer readable program code configured to monitor is further configured to:

obtain new measurements for the server side data packet RTT and the client side data packet RTT; and modify the maximum capacity for the server side buffer and the maximum capacity for the client side buffer using the new server side data packet RTT, the new client side data packet RTT, and the weighted average of the capacity of the memory buffer.

15. The computer program product of claim 12, wherein the computer readable program code configured to measure and to calculate are further configured to:

measure the server side data packet RTT, the client side data packet RTT, a server side transmission rate, and a client side transmission rate; and calculate the maximum capacity for the server side buffer and the maximum capacity for the client side buffer using the server side data packet RTT, the client side RTT, the server side transmission rate, the client side transmission rate, and the weighted average of the capacity of the memory buffer.

16. The computer program product of claim 15, wherein the computer readable program code configured to monitor is further configured to:

obtain new measurements for the server side transmission rate and the client side transmission rate; and modify the maximum capacity for the server side buffer and the maximum capacity for the client side buffer using the server side data packet RTT, the client side data packet RTT, the new server side transmission rate, the new client side transmission rate, and the weighted average of the capacity of the memory buffer.

17. A system for allocating buffers for a TCP proxy session between a client and a server, comprising:

a processor; and a non-transitory computer readable storage medium having computer readable program code embodied therewith, the computer readable program code executed by the processor configured to:

monitor dynamic server side network behaviors for a server side session of the TCP proxy session and dynamic client side network behaviors for a client side session of the TCP proxy session; and allocate capacity for a server side buffer and capacity for a client side buffer in a memory buffer based on the dynamic server side network behaviors, the dynamic client side network behaviors, and a weighted average of a capacity of the memory buffer, the allocating comprising:

receive a server side session data packet from the server, or receive a client side session data packet from the client;

determine whether an available capacity of the server side buffer is sufficient to store the server side session data packet, or determine whether an available capacity of the client side buffer is sufficient to store the client side session data packet;

in response to determining that the available capacity of the server side buffer is not sufficient to store the server side session data packet, increase the allocated capacity of the server side buffer, or in response to determining that the available capacity of the client side buffer is not sufficient to store the client side session data packet, increase the allocated capacity of the client side buffer; and adjust the available capacity of the server side buffer according to the increase of the allocated capacity of the server side buffer, or adjust the available capacity of the client side buffer according to the increase of the allocated capacity of the client side buffer.

18. The system of claim 17, wherein the computer readable program code configured to allocate is further configured to:

calculate a maximum capacity for the server side buffer and a maximum capacity for the client side buffer based on the dynamic server side network behaviors, the dynamic client side network behaviors, and the weighted average of the capacity of the memory buffer; and allocate the capacity for the server side buffer and the capacity for the client side buffer based on the maximum capacity for the server side buffer and the maximum capacity for the client side buffer.

19. The system of claim 17, wherein the computer readable program code configured to increase is further configured to:

in response to determining that the available capacity of the server side buffer is not sufficient to store the server side session data packet, determine whether the allocated capacity of the server side buffer is smaller than a maximum capacity of the server side buffer, or in response to determining that the available capacity of the client side buffer is not sufficient to store the client side session data packet, determine whether the allocated capacity of the client side buffer is smaller than a maximum capacity of the client side buffer;

in response to determining that the allocated capacity of the server side buffer is smaller than the maximum capacity of the server side buffer, determine whether there is sufficient memory space within the maximum capacity of the server side buffer to store the server side session data packet, or in response to determining that the allocated capacity of the client side buffer is smaller than the maximum capacity of the client side buffer, determine whether there is sufficient memory space within the maximum capacity of the client side buffer to store the client side session data packet; and in response to determining that there is sufficient memory space within the maximum capacity of the server side buffer to store the server side session data packet, allocate the memory space to the server side buffer and adjust the available capacity of the server side buffer according to the allocated memory space, or in response to determining that there is sufficient memory space within the maximum capacity of the client side buffer to store the client side session data packet, allocate the memory space to the client side buffer and adjust the available capacity of the client side buffer according to the allocated memory space.

20. The system of claim 18, wherein the computer readable program code configured to monitor and to calculate is further configured to:

measure a server side data packet round trip time (RTT) and a client side data packet RTT; and calculate the maximum capacity for the server side buffer and the maximum capacity for the client side buffer using the server side data packet RTT, the client side data packet RTT, and the weighted average of the capacity of the memory buffer.

21. The system of claim 20, wherein the weighted average of the capacity of the memory buffer is biased toward the server in calculating the maximum capacity for the server side buffer, or wherein the weighted average of the capacity of the memory buffer is biased toward the client in calculating the maximum capacity for the client side buffer.

22. The system of claim 20, wherein the computer readable program code configured to monitor is further configured to:

obtain new measurements for the server side data packet RTT and the client side data packet RTT; and modify the maximum capacity for the server side buffer and the maximum capacity for the client side buffer using the new server side data packet RTT, the new client side data packet RTT, and the weighted average of the capacity of the memory buffer.

23. The system of claim 20 wherein the computer readable program code configured to measure and to calculate is further configured to:

measure the server side data packet RTT, the client side data packet RTT, a server side transmission rate, and a client side transmission rate; and calculate the maximum capacity for the server side buffer and the maximum capacity for the client side buffer using the server side data packet RTT, the client side RTT, the server side transmission rate, the client side transmission rate, and the weighted average of the capacity of the memory buffer.

24. The system of claim 23, wherein the computer readable program code configured to monitor is further configured to:

obtain new measurements for the server side transmission rate and the client side transmission rate; and modify the maximum capacity for the server side buffer and the maximum capacity for the client side buffer using the server side data packet RTT, the client side data packet RTT, the new server side transmission rate, the new client side transmission rate, and the weighted average of the capacity of the memory buffer.

* * * * *